United States Patent [19]
Ashcroft et al.

[11] Patent Number: 5,772,793
[45] Date of Patent: Jun. 30, 1998

[54] TUBE-IN-TUBE THERMOPHOTOVOLTAIC GENERATOR

[75] Inventors: John Ashcroft; Brian Campbell, both of Scotia; David DePoy, Clifton Park, all of N.Y.

[73] Assignee: The United States of America as represented by the United States Department of Energy, Washington, D.C.

[21] Appl. No.: 697,836

[22] Filed: Aug. 28, 1996

[51] Int. Cl.$^6$ .............................................. H01L 31/058
[52] U.S. Cl. .................................................. 136/253
[58] Field of Search ........................... 136/253, 259, 136/248

[56] References Cited

U.S. PATENT DOCUMENTS

| | | | |
|---|---|---|---|
| 4,750,943 | 6/1988 | Nelson | 136/253 |
| 4,776,895 | 10/1988 | Goldstein | 136/253 |
| 5,356,487 | 10/1994 | Goldstein et al. | 136/253 |

OTHER PUBLICATIONS

E. Kittl et al, "Design Analysis of TPV Generator System", *25th Power Sources Conference Proceedings* (1972).
D. R. Burger et al, "Low–Bandgap Thermophotovoltaic System Design" (Am. Chem. Soc. 1993).
L.D. Woolf, "Optimum Efficiency Of Single And Multiple Bandgap Cells In Thermophotovoltaic Energy Conversion", *Solar Cells*, 19, pp. 18–38 (1987).
P.F. Baldasaro, et al., "Experimental Assessment Of Low Temperature Voltaic Energy Conversion", *AIP Conference Proceedings* 321, pp. 29–43, (1994).
L. Fraas et al., "Electric Power Production Using New GaSb Photovoltaic Cells With Extended Infrared Response", *AIP Conference Proceedings* 321, pp. 44–53, (1994).

*Primary Examiner*—Nam Nguyen
*Attorney, Agent, or Firm*—Virginia B. Caress; William R. Moser; Paul A. Gottlieb

[57] ABSTRACT

A thermophotovoltaic device includes at least one thermal radiator tube, a cooling tube concentrically disposed within each thermal radiator tube and an array of thermophotovoltaic cells disposed on the exterior surface of the cooling tube. A shell having a first end and a second end surrounds the thermal radiator tube. Inner and outer tubesheets, each having an aperture corresponding to each cooling tube, are located at each end of the shell. The thermal radiator tube extends within the shell between the inner tubesheets. The cooling tube extends within the shell through the corresponding apertures of the two inner tubesheets to the corresponding apertures of the two outer tubesheets. A plurality of the thermal radiator tubes can be arranged in a staggered or an in-line configuration within the shell.

17 Claims, 5 Drawing Sheets

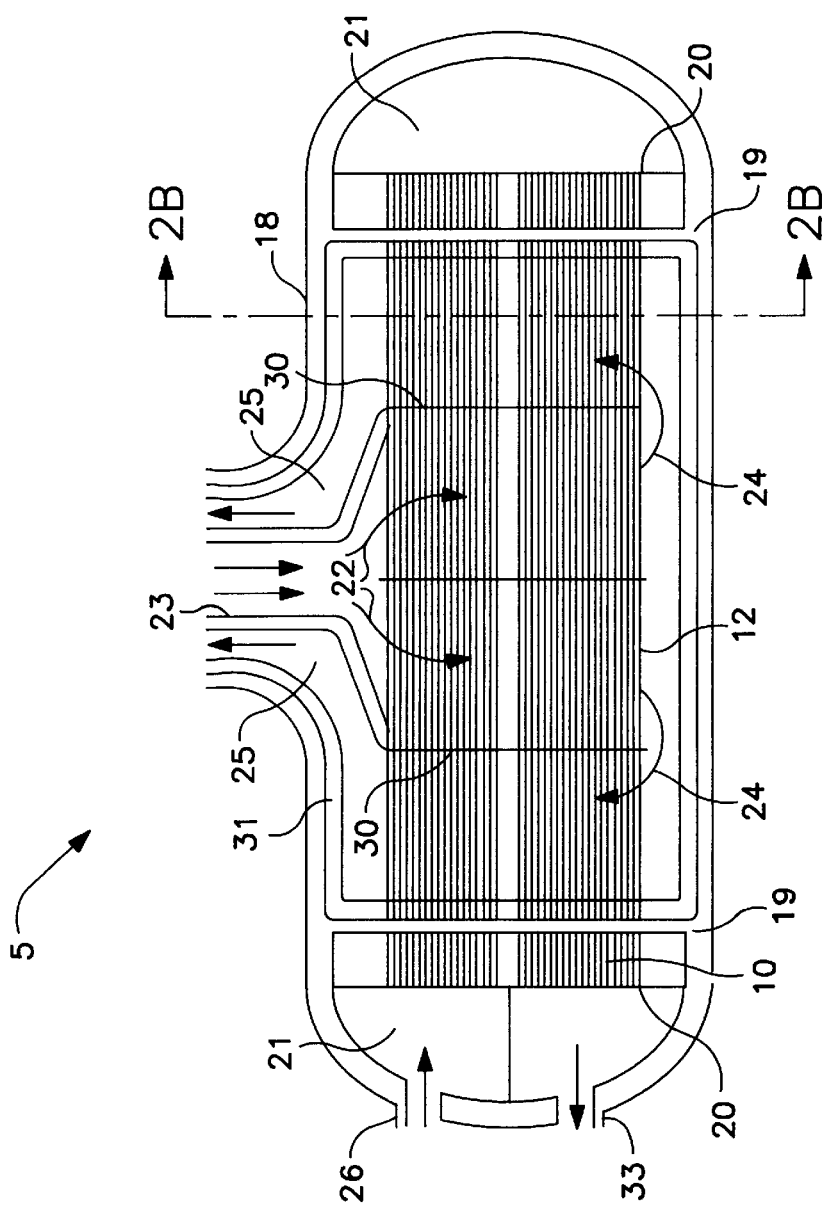
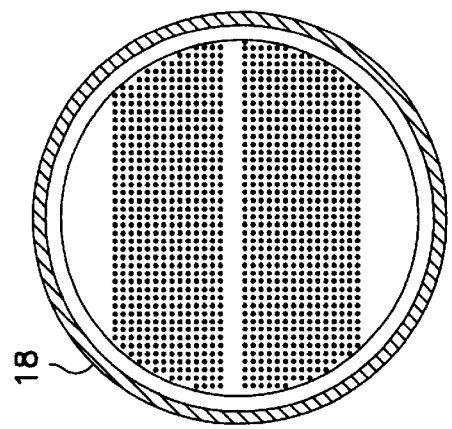
FIG. 2A
FIG. 2B

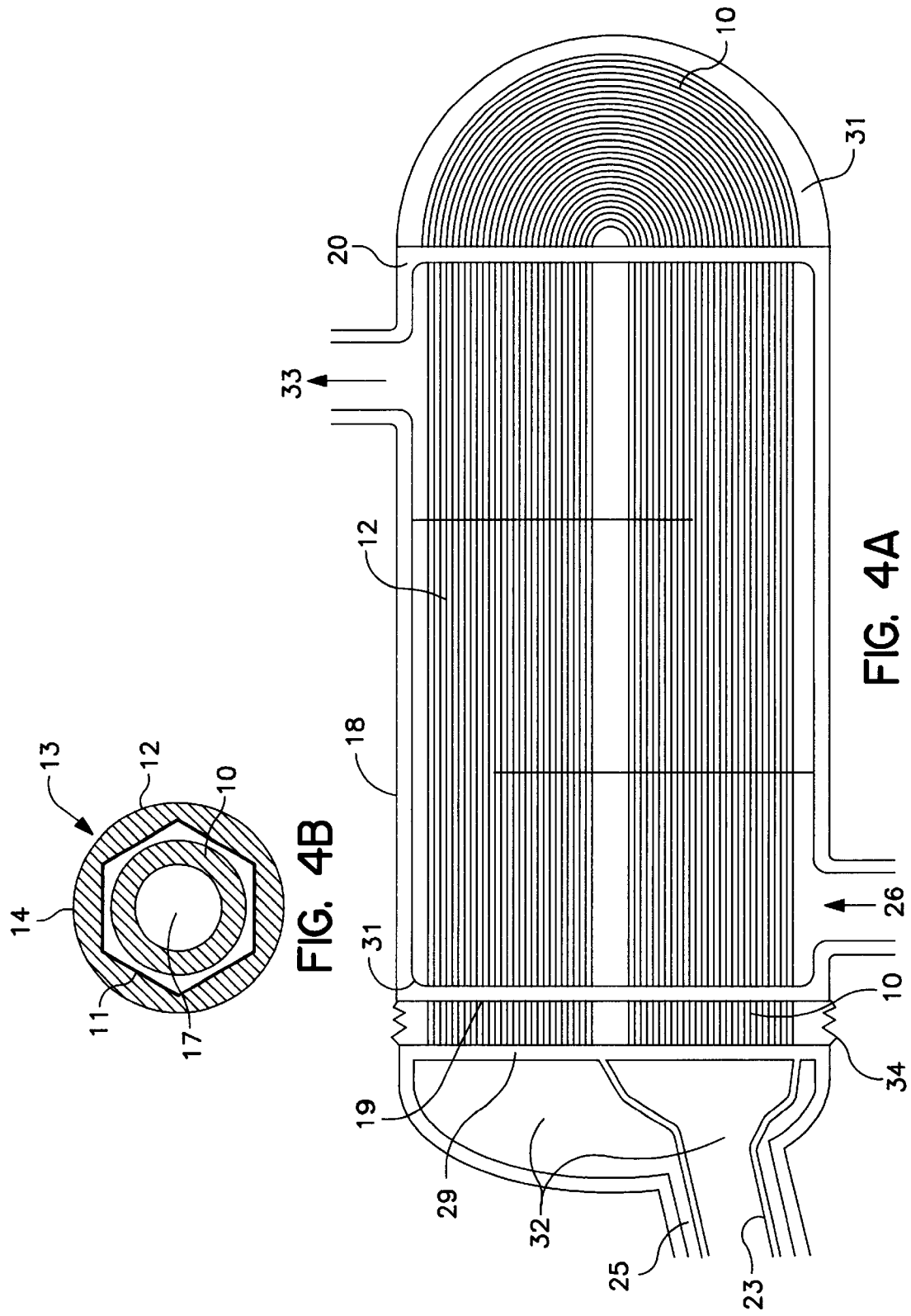

TUBE-IN-TUBE THERMOPHOTOVOLTAIC GENERATOR

CROSS-REFERENCE TO RELATED APPLICATIONS

The present application is based on work performed under Department of Energy Contract DE-AC12-76SN00052.

BACKGROUND OF THE INVENTION

1. Field of the Invention

The present invention relates generally to the field of direct energy conversion. More specifically, the present invention relates to a thermophotovoltaic generator system that converts energy from photons emitted from a heated radiator into electricity.

2. Description of the Related Art

Thermophotovoltaic (TPV) energy conversion is an alternative to more traditional forms of electrical energy production using turbomachinery. TPV energy conversion, like other direct energy conversion systems, requires no moving parts. Instead, TPV energy conversion uses low bandgap semiconductor cells that are "tuned" to the long wavelength photons produced by radiators heated to between 1000° F. and 3000° F. The low bandgap semiconductor cells used for TPV energy conversion are similar in design to higher bandgap solar (photovoltaic) cells.

Recent improvements in low bandgap cell performance and photon spectral control techniques have allowed for the possibility of developing efficient, cost competitive energy conversion devices, as described by P. F. Baldasaro et al., "Experimental Assessment of Low Temperature Voltaic Energy Conversion", AIP Conference Proceedings 321, pp. 29–43, 1994. For example, TPV devices are currently being developed for vehicles as well as for portable power generation, as described by L. Fraas et al., "Electric Power Production using New GaSb Photovoltaic Cells with Extended Infrared Response", AIP Conference Proceedings 321, pp. 44–53, 1994.

Thermophotovoltaic (TPV) energy systems convert thermal energy to electric power using the same principle of operation as solar cells. A high temperature radiator emits photons that are, incident on a semiconductor TPV cell. In a practical TPV generator system, the photon radiators are heated to their desired temperature by any hot flowing fluid (typically a gas). Radiated photons with energy greater than the semiconductor bandgap are absorbed in the TPV cell and excite electrons from the valence band to the conduction band (interband transition). The resultant electron-hole pairs are then collected by metal contacts which can power an electrical load. Additionally, some form of spectral control should be employed for reflecting the photons having energy less than the semiconductor bandgap back to the radiator. Spectral control can be attained by employing any one or combination of three different approaches: selective emission of high energy photons and suppression of low energy photons from the radiator surface; selective filtering of the photon spectrum incident on the TPV cell; and back surface reflection of low energy photons.

To function most efficiently, the TPV cells must be kept cool. Cooling water is used to maintain cell temperatures in the range of 100° F. to 200° F. A vacuum can be created between the radiators and TPV cell-covered cooling channels to improve efficiency by minimizing conductive and convective heat transfer.

For large scale energy production, a primary design concern of a TPV system, along with efficiency, is power density. In the temperature range of interest, between 1500° F. and 2000° F., the photon flux from a radiator is low and electrical output is in the range of 1.6 to 8.0 $W/in^2$ of TPV cell area. This requires a large surface area of TPV cells for producing sufficient power for large scale energy production. Various approaches for configuring radiators and TPV cell cooling channels in compact arrangements have been investigated for maximizing generator output for a given volume. For example, flat plate concepts and concepts incorporating radiator fins have been considered.

SUMMARY OF THE INVENTION

One embodiment of the present invention provides a thermophotovoltaic device that includes at least one thermal radiator tube, a cooling tube concentrically disposed within each thermal radiator tube with the cooling tube having an exterior surface and an interior surface, and an array of thermophotovoltaic cells disposed on the exterior surface of the cooling tube. Preferably, the cooling tube has a hexagonal exterior cross-sectional shape. A vacuum can be formed in the space between the thermal radiator tube and the cooling tube. A shell having a first end and a second end surrounds the thermal radiator tube. Inner and outer tubesheets each having an aperture corresponding to each cooling tube are located at each end of the shell. The thermal radiator tube and the cooling tube extend within the shell between the tubesheets. The cooling tube extends within the shell through the corresponding aperture of the inner tubesheets to the corresponding apertures of the outer tubesheets. A plurality of thermal radiator tubes can be arranged in a staggered or an in-line configuration within the shell. Insulation can be placed on the internal surfaces of the shell and the inner tubesheets to reduce parasitic heat loss and protect the shell from the hot gas. Fluid, such as a hot gas, enters a fluid inlet in the shell and flows across the thermal radiator tubes to a fluid outlet in the shell. The hot gas inlet and outlet can be configured in a pipe-in-pipe arrangement and the shell can include internal baffles for directing the flow of the gas. Coolant enters a coolant inlet and flows through the cooling tube to a coolant outlet. Preferably, the thermal radiator tube and the cooling tube can include heat transfer enhancing devices such as fins, an insert or a swirler. Between the inner tubesheets and the outer tubesheets at each end of the generator, an expansion bellows is used to accommodate the differential thermal expansion of the hot radiator tubes as compared to the colder cooling tubes. The expansion bellows also acts to retain the vacuum in the gap between the radiator tubes and the cooling tubes. Electrical feed-throughs penetrate through the shell in the vacuum regions separating the inner and outer tubesheets at each end of the generator.

Another embodiment of the present invention provides a thermophotovoltaic device that includes at least one cooling tube, a thermal radiator tube concentrically disposed within each cooling tube, and an array of thermophotovoltaic cells disposed on an interior surface of the cooling tube. In this embodiment, first and second tubesheets each have an aperture corresponding to each thermal radiator tube and are located at the first end of the shell. A third tubesheet has an aperture corresponding to each thermal radiator tube and is located at the second end of the shell. The cooling tube extends within the shell between the second tubesheet and the third tubesheet and the thermal radiator tube extends within the shell from the first tubesheet through the corresponding upper apertures of the second and third tubesheets and back through the corresponding lower apertures of the third and second tubesheets to the first tubesheet. Similar to the first embodiment, the cooling tubes of the second embodiment can be arranged in a staggered or an in-line configuration within the shell. The shell includes a coolant inlet and a coolant outlet with coolant entering the coolant inlet flowing across the cooling tube to the coolant outlet. In addition, one end of the shell has a fluid inlet and a fluid outlet with fluid, such as a hot gas, entering the fluid inlet flowing through the thermal radiator tube to the fluid outlet.

BRIEF DESCRIPTION OF THE DRAWINGS

The present invention is illustrated by way of example and not limitation in the accompanying Figures in which like reference numerals indicate similar elements and in which:

FIGS. 2A and 2B show a side view and an end view, respectively, of a first embodiment of a tube-in-tube TPV energy conversion system according to the present invention;

FIGS. 4A and 4B show a side view of a second embodiment of a tube-in-tube TPV energy conversion system and a cross-sectional view of tube-in-tube configuration for the second embodiment, respectively, according to the present invention.

DETAILED DESCRIPTION OF THE PREFERRED EMBODIMENTS

Figure 1:
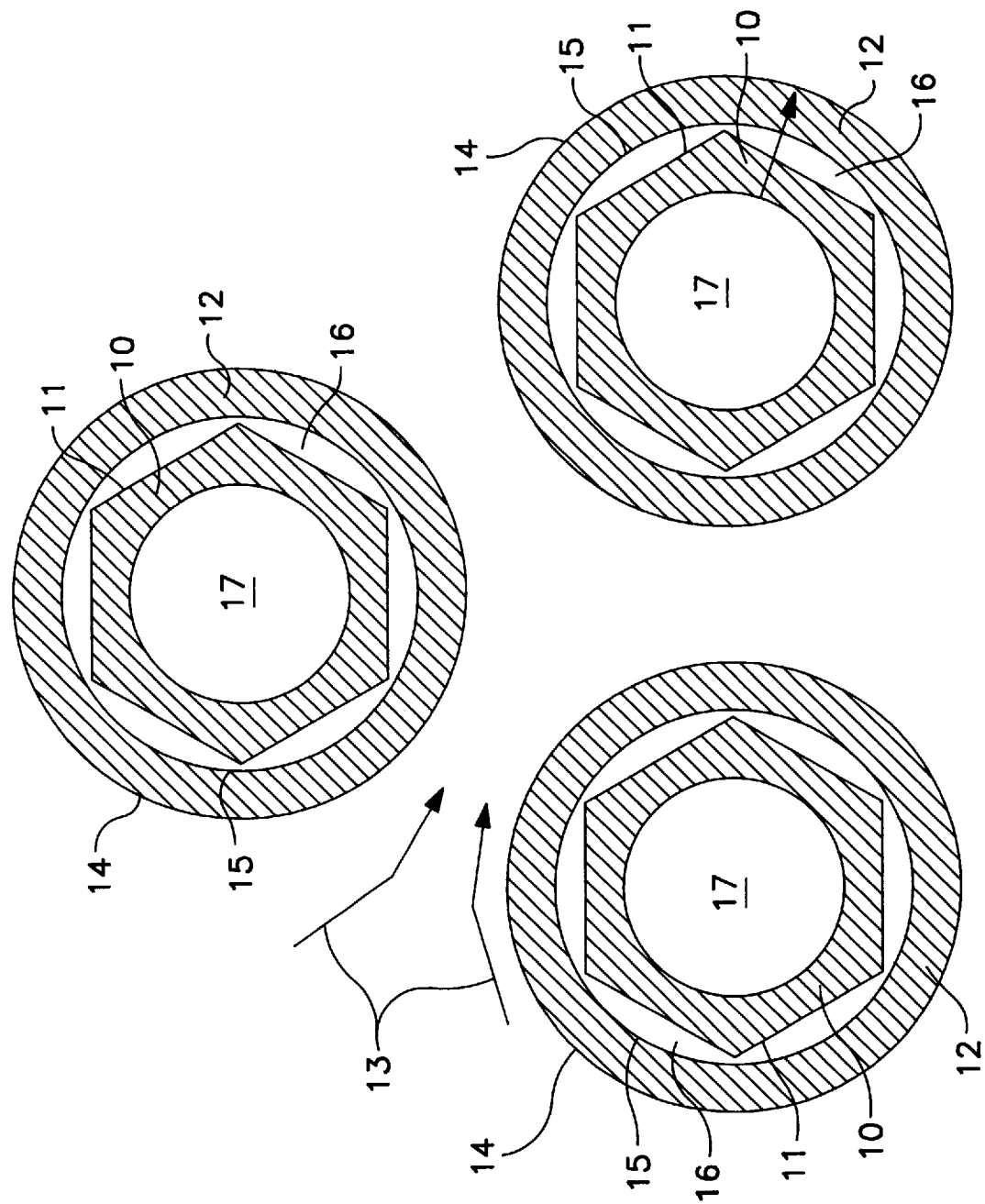
FIG. 1 shows a cross-sectional view of three sets of tubes in a staggered configuration for a tube-in-tube TPV energy conversion system according to the present invention.
Figure 3:
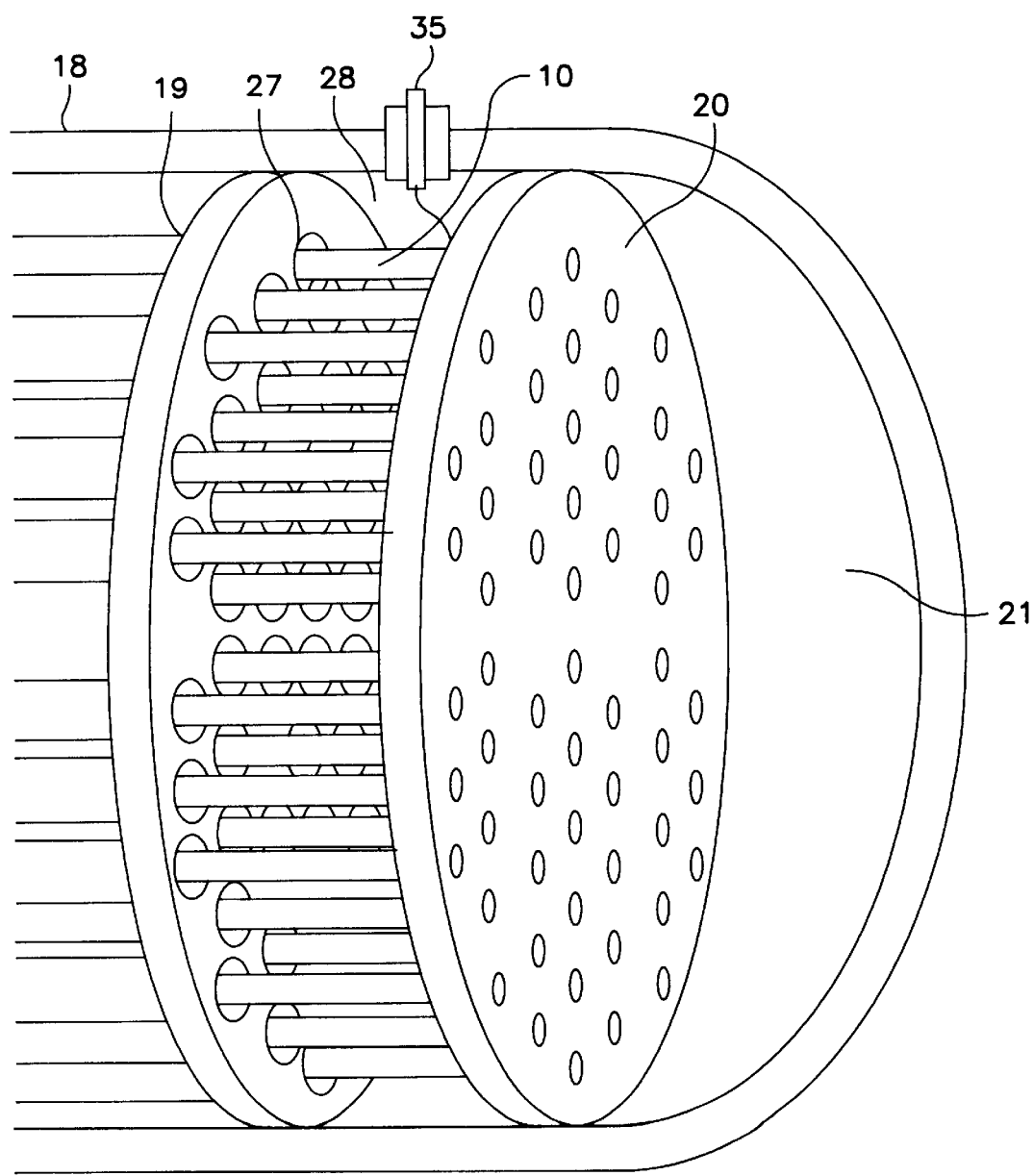
FIG. 3 shows detail of a generator tubesheet region of a tube-in-tube TPV energy conversion system according to the present invention.

The present invention uses sets of concentric tubes for transferring photons from a hot radiator tube to a TPV cell-covered cooling tube. FIG. 1 shows a cross-sectional view of three sets of concentric tubes arranged in a staggered (triangular) configuration. The sets of tubes, shown in FIG. 1, can also be arranged in other configurations, such as an in-line (rectangular) bundle configuration (FIG. 5B), for example. In FIG. 1, inner tubes 10 are located concentrically within outer tubes 12. Inner tubes 10 are covered with TPV cells 11. Externally heated hot gas 13 flows across the outside surface 14 of outer tubes 12. The inner surface 15 of the heated outer tube 12 radiates photons across a gap 16 (which can be evacuated to improve efficiency) to the cooler TPV cell-covered inner tubes 10. Coolant, such as water, for example, flows in cavities 17 within inner tubes 10 for removing waste heat and cooling the TPV cells The concentric tubes 10 and 12 can be housed in a shell 18 (FIG. 2) of any configuration; however, a cylindrical shell is preferred for applications using high pressure gases. An inner tubesheet 19 and an outer tubesheet 20 are located at each end of shell. The radiator tubes 12 attach to the inner tubesheets 19 while the cooling water tubes 10 pass through holes 27 (FIG. 3) in the inner tubesheets 19 and attach to the outer tubesheets 20. Cooling water plenums 21, shown in FIG. 3, are located at each end of generator 5.

Between the inner tubesheets 19 and the outer tubesheets 20 at each end of the generator 5, an expansion bellows 34, shown in FIG. 4A (not shown in FIGS. 2 and 3) is used to accommodate the differential thermal expansion of the hot radiator tubes 12 as compared to the colder cooling tubes 10. The expansion bellows 34 also acts to retain the vacuum in the gap 16 between the radiator tubes 12 and cooling tubes 10.

The overall size of a generator is determined by tube size and spacing, the operating temperature, and the desired power output. The temperature sensitivity of a TPV generator system is strong due to a fourth order temperature dependence of radiative heat transfer. Also, the percentage of photons emitted by the radiator that are high-energy useful photons increases with temperature. Thus, the resulting power density dependence on temperature is approximately a seventh order effect. This means that the power density of a system with a similar geometry will be five times greater at an average temperature of 2000° F. than at 1500° F.

Smaller tubes with tighter spacings allow for increased power density. The practical lower limit on an outside tube 12 outside diameter OD is 0.50". This allows for 0.175" (0.45 cm) wide TPV cells on the six flat sides of a hexagonally shaped inner cooling water tube 10. Larger diameter tubes allow for an increased number of sides on the inner, TPV cell-covered tube 10. The tube-to-tube pitch is in the range of 0.65" to 1.25" for maximizing power density and minimizing hot gas flow pressure drop.

Table I sets forth a range of exemplary geometric options and the corresponding resulting performance potentials for the tube-in-tube concept. It should be noted that any tube-in-tube geometry or dimensions are considered to fall within the scope of the present invention. For example, the generator system 5 of FIG. 2 could be a 6.5 MW electrical output generator having a 1.6 W/in$^2$ average surface power density and a 0.5" outer tube OD. The heat exchanger power density would be about 8.3 kW/ft$^3$ (0.3 kW/l) with an average operating temperature of 1500° F. The heat exchanger volume would be 783 ft$^3$, and would make about 45% of the total generator volume which would be 1740 ft$^3$. This would be approximately 22 ft long by 10 ft in diameter.

TABLE I

| Range of Geometric and Performance Attributes | |
| --- | --- |
| Outer Tube OD | 0'.50"–1.00" |
| Inner Tube min OD | 0.35"–0.70" |
| Tube Pitch | 0.65"–1.25" |
| Cell Packing Density | 1.5–3.0 in$^2$/in$^3$ |
| Surface Power Density | |
| @ 1500° F. | 1.3–2.0 W/in$^2$ |
| @ 2000° F. | 17.5–52.5 kW/ft$^2$ |
| Heat Exchanger Power Density | |
| @ 1500° F. | 3.5–10.5 kW/ft$^3$ |
| @ 2000° F. | 17.5–52.5 kW/ft$^3$ |
| Generator Power Density | |
| @ 1500° F. | 1.4–5.0 kW/ft$^3$ |
| @ 2000° F. | 7.0–25.0 kW/ft$^3$ |

Although all design requirements are dependent on a particular application, in general, the hot gas flow through generator 5 should be designed to provide uniform heating of the radiator tubes 12 with a minimum of pressure drop. A cross flow configuration within tightly packed tube bundles provides an excellent tradeoff between the heat transfer coefficient and pressure drop, as disclosed by A. A. Zukauskas, "High Performance Single-Phase Heat Exchangers", Hemisphere Publishing, 1989. The gas flow 22 from an inlet nozzle 23, that is an inner portion of a pipe-in-pipe gas duct, spreads the gas flow across the middle half of the radiator tubes 12, as shown in FIG. 2A. The gas flows across the tube bundle to the other side of the generator where it turns and flows back 24 over the end sections of the tube bundle as directed by internal baffle plates 30. The gas exits into an outer annulus 25 of the pipe-in-pipe gas duct and is circulated back to the heat source. Other options for gas flow include using separate inlet and outlet nozzles (not shown) with internal baffle plates directing the flow across the tube bundle.

The temperature drop from the hot gas 13 to a radiator tube's inner surface 15 is dependent on the gas flow rate and thermal conductivity, and the heat flux. The higher heat flux at 2000° F. operating conditions will increase the temperature drop. If pressurized helium is used as the hot gas 13, the temperature drop at 1500° F. is expected to be less than 20° F.

The coolant, such as water, for example, enters through a nozzle 26 at one end of generator 5 and is distributed into the many cooling water flow tubes 10. The water flows to the other end of generator 5 where it turns and flows back through the other half of generator 5 to an exit nozzle 33. An alternative embodiment would be to have the exit nozzle at the opposite end of the generator from the inlet nozzle, allowing a once-through flow of coolant through generator 5.

The radiator temperature, and therefore the power density, is limited by the capabilities of the radiator materials. The radiator tubes 12, for the embodiment shown in FIG. 2, must withstand compressive pressure loadings at high temperature for the life of the generator and must have high radiative emissivities for maximizing radiative heat flux. Radiator tubes 12 also need to be hermetic for minimizing gas permeation into a vacuum region 16 between tubes 10 and 12, should a vacuum be used.

Metals, ceramics, and ceramic composites can all be considered for radiator materials, depending on requirements for a particular application such as cost, pressure loading, temperatures, etc. Metallic superalloys are limited by creep performance at the higher temperatures used by TPV systems and ceramics lack toughness and hermeticity. Ceramic composites, particularly silicon carbide composites, are preferred based on an increased toughness when compared to a ceramic, low thermal growth, and good inherent radiative properties. Hermetic ceramic composites can also be used. If improved hermeticity is needed for a particular application, the outside surface of the tubes can be coated with a metallic cover for sealing.

Shell 18 and tubesheets 19 and 20 can be protected from the hot gas with internal insulation 31 (FIG. 2A). Common well-known industrial insulation, such as Kaowool, for example, can be used for reducing the shell temperature down to 500° F. to 600° F., allowing use of conventional carbon steel alloys for the shell.

Mechanical concerns are the external pressure loading on the radiators tubes, the bending of the tubes and the bending stresses caused by thermal expansion of the tubesheets. Ceramic composite tubes are well suited for handling external stresses. In the system shown in FIG. 2, the tube thickness is selected so that a 1000 psi external pressure will result in only a −5000 psi compressive stress. Bending loads in the tubes are minimized by using periodic supports (30). Preferably, one tube support plate is needed for every 3 to 4 ft of tube length for minimizing bending loads.

Thermal growth of the hotter inner tubesheet 19 will be greater than that of the outer cooling water tubesheet 20, even when internal insulation is used. This differential growth causes alignment mismatch and bending of the ends of the cooling water tubes. It is estimated that, for the large scale exemplary system of FIG. 2, at least 1 ft of space is needed between the tubesheets for allowing bending to occur with acceptable stresses.

To maximize output, current matched cells must have similar performance and similar illumination, that is, similar photon density. Similar illumination is provided by having a radiator at a uniform temperature. The radiator temperature distribution for the system of FIG. 2 is good because of a good gas flow distribution and a low temperature drop from the hot gas. Power produced by the TPV cells can be removed through an electrical feed-throughs 35 provided in the vacuum regions 28 separating the tubesheets 19 and 20 at each end of generator 5 as shown in FIG. 3.

An alternative embodiment to the embodiment of FIG. 1 is a system as shown in FIGS. 4A and 4B. In this system inner tubes 10 are located concentrically within outer tubes 12. The inner surface of the outer tube 12 is lined with TPV cells 11. In this embodiment, the fluid, such as hot gas, is contained within the inner tubes and in the plenums 32 at the first end of the shell. Coolant, such as water, flows across the outside surface 14 of outer tubes 12. The coolant enters through a nozzle 26 at one side of generator 5 and flows across the many cooling tubes and exits through the coolant exit 33 at the opposite side of the generator.

The concentric tubes 10 and 12 are housed in a shell 18. A first tubesheet 29 and second tubesheet 19 are located at the first end of the shell. A third tubesheet 20 is located at the second end of the shell. The cooling tubes 12 attach to the second tubesheet 19 and the third tubesheet 20. The radiator tubes 10 are attached to the first tubesheet and pass through the upper aperture holes of the second tubesheet and third tubesheet and back through the lower aperture holes of the third and second tubesheets to the first tubesheet.

Figure 5B:
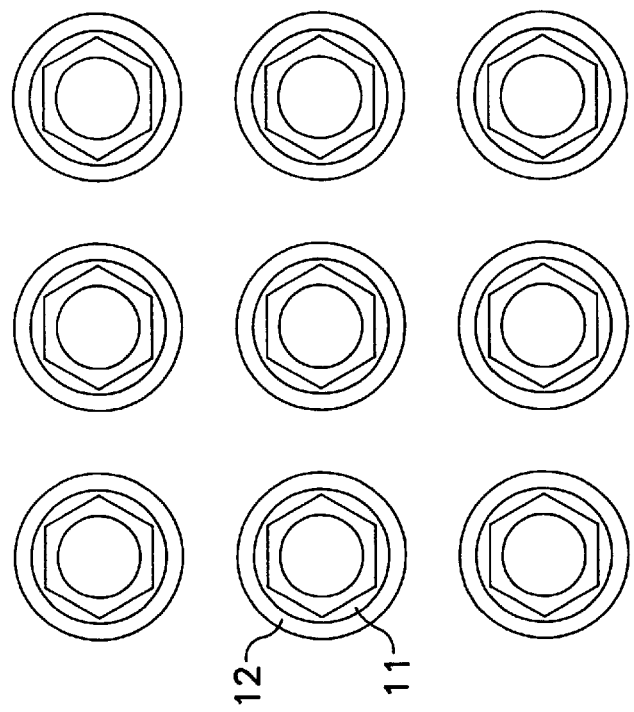
FIGS. 5A and 5B respectively show two tube bundle configurations according to the present invention.
Figure 5A:
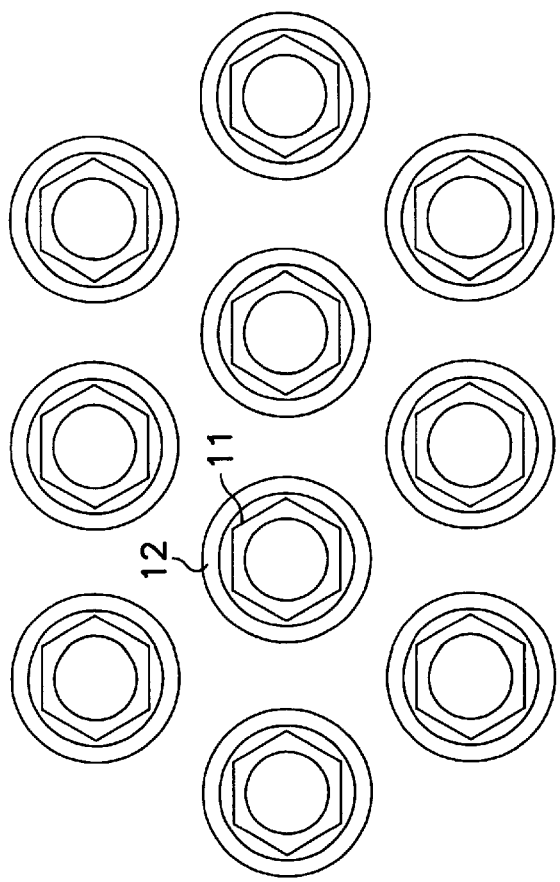

Another configuration of tubes is that of an in-line (or rectangular) tube bundle configuration, as shown in FIG. 5B, instead of the staggered tube bundle configuration of FIGS. 1 and 5A. The rectangular tube bundle configuration can be advantageous for minimizing pressure drop, but has a correspondingly lower heat transfer rate when compared to the staggered tube bundle configuration.

Heat transfer enhancement on the hot gas side and/or on the cooling water side can help to reduce film temperature drops. On the hot gas side, external fins could be used for increasing the heat transfer coefficient by a factor of two to three. On the water side, internal fins, ribbed tubes, or helical inserts can be used to increase the heat transfer coefficient. The drawback of any type of heat transfer enhancement is that it increases the pressure drop of the flowing fluid, causing an increase in the required pumping power.

The present invention requires an external supply of heated gas and coolant, and can be utilized in any situation where long term or emergency electricity generation is desired. The exemplary 6.5 MW electrical output generator system can be used for large scale commercial or maritime electrical production utilizing a combustor or a nuclear reactor for providing the heated gas. Preferably, helium is used as a gas because it has excellent heat transfer properties and an inert nature. Air and combustion product gases can also be used. Smaller scale applications can use a small external combustor as the heat source. Placing a generator in a home heating furnace allows for emergency electricity generation during a power failure. Portable units can use propane burners for creating electricity for camping or for military use.

What is claimed is:

1. A thermophotovoltaic device comprising:
   at least one thermal radiator tube;

a cooling tube concentrically disposed within said at least one thermal radiator tube, the cooling tube having an exterior surface and an interior surface;

an array of thermophotovoltaic cells disposed on the exterior surface of the cooling tube, wherein the cooling tube has an hexagonal exterior cross-sectional shape;

a shell surrounding the at least one thermal radiator tube, the shell having a first end and a second end; and an inner and an outer tubesheet located at the first and at the second end of the shell, each tubesheet having an aperture corresponding to each cooling tube, the at least one thermal radiator tube extending within the shell between the inner tubesheets, and the cooling tube extending within the shell through the corresponding apertures of the inner tubesheets to the corresponding apertures of the outer tubesheets.

2. A thermophotovoltaic device according to claim 1, further comprising a plurality of thermal radiator tubes arranged in a staggered configuration within the shell.

3. A thermophotovoltaic device according to claim 1, further comprising a plurality of thermal radiator tubes arranged in an in-line configuration within the shell.

4. A thermophotovoltaic device according to claim 1, wherein the shell has an internal surface and the inner tubesheets each have an internal surface, the thermal radiator tube extending between the respective internal surfaces of the inner tubesheets, the thermophotovoltaic device further comprising insulation on the internal surface of the shell and the respective internal surfaces of the inner tubesheets.

5. A thermophotovoltaic device according to claim 1, wherein the shell includes a fluid inlet and a fluid outlet, fluid entering the fluid inlet and flowing across the thermal radiator tubes to the fluid outlet.

6. A thermophotovoltaic device according to claim 5, wherein the fluid is a gas.

7. A thermophotovoltaic device according to claim 6, wherein the shell includes internal baffles for directing a flow of the gas.

8. A thermophotovoltaic device according to claim 6, wherein the fluid inlet and the fluid outlet are configured in a pipe-in-pipe arrangement.

9. A thermophotovoltaic device according to claim 6, wherein the shell includes a coolant inlet and a coolant outlet, coolant entering the coolant inlet flowing through each cooling tube to the coolant outlet.

10. A thermophotovoltaic device according to claim 9, wherein the thermal radiator tube has an external surface and the cooling tube has an internal surface, wherein one of either the external surface of the thermal radiator tube or the internal surface of the cooling tube includes one of a fin, an insert or a swirler.

11. A thermophotovoltaic device according to claim 1, wherein the shell includes an electrical feed-through between the inner and outer tubesheets.

12. A thermophotovoltaic device according to claim 11, wherein a space between the thermal radiator tube and the cooling tube forms a vacuum.

13. A thermophotovoltaic device comprising:

at least one cooling tube, the cooling tube having an exterior surface and an interior surface;

a thermal radiator tube concentrically disposed within said at least one cooling tube, an array of thermophotovoltaic cells disposed on the interior surface of the at least one cooling tube, wherein the at least one cooling tube has an hexagonal interior cross-sectional shape;

a shell surrounding the at least one cooling tube, the shell having a first end and a second end;

first and second tubesheets located at the first end of the shell, the first and second tubesheets each having an aperture corresponding to each thermal radiator tube; and a third tubesheet located at the second end of the shell, the third tubesheet having an aperture corresponding to each thermal radiator tube, the cooling tube extending within the shell between the second tubesheet and the third tubesheet and the thermal radiator tube extending within the shell from the first tubesheet through corresponding upper apertures of the second and third tubesheets back through corresponding lower apertures of the third and second tubesheets to the first tubesheet.

14. A thermophotovoltaic device according to claim 13, further comprising a plurality of cooling tubes, the plurality of cooling tubes being arranged in a staggered configuration within the shell.

15. A thermophotovoltaic device according to claim 13, further comprising a plurality of cooling tubes, the plurality of cooling tubes being arranged in an in-line configuration within the, shell.

16. A thermophotovoltaic device according to claim 13, wherein the shell includes a coolant inlet and a coolant outlet, coolant entering the coolant inlet and flowing across the cooling tube to the coolant outlet; and a fluid inlet and a fluid outlet, fluid entering the fluid inlet flowing through the thermal radiator tubes to the fluid outlet; and wherein the shell includes an electrical feed-through between the first and second tubesheets, and further includes an expansion bellows between the first and second tubesheets to accommodate the differential thermal expansion of the hot thermal radiator tubes as compared to the colder cooling tubes.

17. A thermophotovoltaic device comprising:

a plurality of thermal radiator tubes;

wherein a cooling tube is concentrically disposed within each thermal radiator tube, the cooling tube having a hexagonal exterior cross-sectional shape;

an array of thermophotovoltaic cells disposed on the exterior surface of each of the cooling tubes;

wherein the space between each thermal radiator tube and the cooling tube forms a vacuum;

a shell surrounding the plurality of thermal radiator tubes, the shell having a first end and a second end;

an inner and an outer tubesheet located at the first end and at the second end of the shell, each tubesheet having an aperture corresponding to each cooling tube, each thermal radiator tube extending within the shell between the inner tubesheets, and the cooling tubes extending within the shell through the corresponding apertures of the inner tubesheets to the corresponding apertures of the outer tubesheets;

wherein the shell includes a fluid inlet and a fluid outlet, fluid entering the fluid inlet and flowing across the thermal radiator tubes to the fluid outlet to heat the thermal radiator, and wherein the shell includes a coolant inlet and a coolant outlet, coolant entering the coolant inlet flowing through each cooling tube to the coolant outlet; and wherein the shell includes an electrical feed-through between the inner and outer tubesheets, and further includes an expansion bellows between the inner and outer tubesheets.

* * * * *